(12) United States Patent
Choi et al.

(10) Patent No.: US 12,535,433 B2
(45) Date of Patent: Jan. 27, 2026

(54) FOCUS CONTROL METHOD FOR SPECTROSCOPIC MEASURING APPARATUS, INSPECTION METHOD FOR SEMICONDUCTOR DEVICE, AND SPECTROSCOPIC MEASURING APPARATUS FOR PERFORMING THE SAME

(71) Applicant: Samsung Electronics Co., Ltd., Suwon-si (KR)

(72) Inventors: Youngsun Choi, Suwon-si (KR); Soonyang Kwon, Suwon-si (KR); Kwangrak Kim, Suwon-si (KR); Jiwoong Kim, Suwon-si (KR); Jangryul Park, Suwon-si (KR); Myungjun Lee, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 156 days.

(21) Appl. No.: 18/340,394

(22) Filed: Jun. 23, 2023

(65) Prior Publication Data

US 2024/0060907 A1   Feb. 22, 2024

(30) Foreign Application Priority Data

Aug. 16, 2022 (KR) .................. 10-2022-0101890

(51) Int. Cl.
*G01N 21/95* (2006.01)
*G01N 21/31* (2006.01)
*G02B 21/24* (2006.01)

(52) U.S. Cl.
CPC ........ *G01N 21/9501* (2013.01); *G01N 21/31* (2013.01); *G01N 2201/068* (2013.01); *G02B 21/248* (2013.01)

(58) Field of Classification Search
CPC .............. G01N 21/31; G01N 21/9501; G01N 2201/068; G01N 2021/213;
(Continued)

(56) References Cited

U.S. PATENT DOCUMENTS 5,815,293 A * 9/1998 Komma ................. G02B 21/20
359/569
7,394,535 B1 7/2008 Chen et al.
(Continued)

FOREIGN PATENT DOCUMENTS

CN   1826518 A * 8/2006 ........... A61B 5/1455
CN   101278190 A * 10/2008 ......... G01N 21/6458
(Continued)

*Primary Examiner* — Tri T Ton
(74) *Attorney, Agent, or Firm* — Wolf, Greenfield & Sacks, P.C.

(57) ABSTRACT

In a focus control method of a spectroscopic measuring apparatus, the spectroscopic measuring apparatus having a first objective lens and a second objective lens equipped with a microsphere is provided. A sample is placed on a stage. A spectrum is obtained while moving the second objective lens vertically downward. A light intensity function that changes with a distance from a sample surface is obtained from the spectrum. A focal position of the second objective lens is determined from a threshold value of the light intensity function.

13 Claims, 15 Drawing Sheets

(58) Field of Classification Search
CPC ....... G01N 2021/8845; G01N 21/8806; G02B 21/248; G03F 7/70653; G03F 7/706845; G09G 2330/02; G09G 3/20; H02M 1/0058; H02M 1/34; H02M 3/04
See application file for complete search history.

(56) References Cited

U.S. PATENT DOCUMENTS

| | | |
|---|---|---|
| 9,726,874 B2 | 8/2017 | Astratov et al. |
| 10,345,093 B2 | 7/2019 | Kassamakov et al. |
| 10,976,566 B2 | 4/2021 | Xiang |
| 11,320,259 B2 | 5/2022 | Kim et al. |
| 2010/0214404 A1 | 8/2010 | Chen et al. |
| 2010/0245816 A1 | 9/2010 | Shen et al. |
| 2015/0276375 A1 * | 10/2015 | Liu ................... G01B 9/0203 356/511 |
| 2020/0166769 A1 | 5/2020 | Stanescu et al. |
| 2021/0208414 A1 | 7/2021 | Astratov |

FOREIGN PATENT DOCUMENTS

| | | | | |
|---|---|---|---|---|
| CN | 108445261 A | | 8/2018 | |
| CN | 112071462 A | * | 12/2020 | ............. G02B 6/262 |
| JP | 2006515925 A | * | 6/2006 | ......... G01B 11/2441 |
| KR | 20100045964 A | | 5/2010 | |
| KR | 20200019748 A | | 2/2020 | |
| KR | 20220021327 A | | 2/2022 | |

\* cited by examiner

FOCUS CONTROL METHOD FOR SPECTROSCOPIC MEASURING APPARATUS, INSPECTION METHOD FOR SEMICONDUCTOR DEVICE, AND SPECTROSCOPIC MEASURING APPARATUS FOR PERFORMING THE SAME

PRIORITY STATEMENT

This application claims priority under 35 U.S.C. § 119 to Korean Patent Application No. 10-2022-0101890, filed on Aug. 16, 2022 in the Korean Intellectual Property Office (KIPO), the contents of which are herein incorporated by reference in their entirety.

BACKGROUND

1. Field

Example embodiments relate to a focus control method for a spectroscopic measuring apparatus, a method of inspecting a semiconductor device, and a spectroscopic measuring apparatus for performing the same. More particularly, example embodiments relate to an auto focus control device of a spectroscopic measuring apparatus for inspecting a pattern formed on a surface of a semiconductor wafer using an objective lens to which a microsphere is applied, and an auto-focus control method using the same.

2. Description of the Related Art

A spectroscopic measuring apparatus such as a spectroscopic reflectometer (SR) or a spectroscopic ellipsometry (SE) obtains a spectroscopic measurement signal through a microscope optical system, thereby measuring physical quantities such as a structure or critical dimension (CD) of a pattern, a thickness of a thin layer, etc., on a surface of a semiconductor wafer. Due to an optical diffraction limit, it may be impossible to measure an area of several tens of nm to several μm required for pattern measurement of an ultra-miniaturized semiconductor device with a spectroscopic measurement apparatus using an existing microscope optical system. In order to overcome this optical diffraction limit, a microsphere-assisted spectroscopic measuring technology using a photonic nanojet effect generated from a microsphere having a size of several microns has been introduced. However, the optical nanojet effect generated in the microsphere may require a focus alignment method different from focusing that is in existing optical lenses.

SUMMARY

Example embodiments provide a highly precise auto focus control method that may be capable of providing throughput and repeatability in a microsphere-assisted spectrometry equipment.

Example embodiments provide a method of inspecting a semiconductor device including the above auto focus control method.

Example embodiments provide a spectroscopic measuring apparatus that may be capable of performing the above inspection method.

According to example embodiments, in a focus control method for a spectroscopic measuring apparatus, the spectroscopic measuring apparatus having a first objective lens and a second objective lens, wherein the second objective lens has a microsphere thereon. A sample is placed on a stage. A spectrum is obtained while moving the second objective lens vertically downward. A light intensity function that changes with a distance from a sample surface is obtained from the spectrum. A focal position of the second objective lens is determined from a threshold value of the light intensity function.

According to example embodiments, in a method of inspecting a semiconductor device, a spectroscopic measuring apparatus having a first objective lens and a second objective lens, wherein the second objective lens has a microsphere thereon. A semiconductor substrate is placed on a stage. A focal position of the second objective is aligned. Reflected light from a surface of the semiconductor substrate is received through the second objective lens. A spectrum is obtained from the received reflected light. In order to align the focal position of the second objective lens, a spectrum is obtained while moving the second objective lens vertically downward, a light intensity function that changes with a distance from the surface of the semiconductor substrate is obtained from the spectrum, and the focal position of the second objective lens is determined from a threshold value of the light intensity function.

According to example embodiments, a spectroscopic measuring apparatus includes a light source configured to generate broadband light, a stage configured to support a sample, an objective lens assembly configured to condense light from the light source as incident light onto a sample surface and having a first objective lens and a second objective lens, wherein the second objective lens has a microsphere thereon, an imaging lens configured to form an image of the reflected light from the sample surface, an optical detector in a first imaging plane of the imaging lens, a spectrometer in a second imaging plane of the imaging lens, a driver configured to move the first and second objective lenses, and a focus control portion configured to control an operation of the driver and adjust focal positions of the first and second objective lenses. The focus control portion is configured to obtain a spectrum from the spectrometer while moving the second objective lens vertically downward from an initial position above the sample surface, to obtain a light intensity function that changes with a distance from the sample surface from the spectrum, and to determine the focal position of the second objective lens from a threshold value of the light intensity function.

According to example embodiments, an ultra-precise auto focusing method corresponding to a spectroscopic measuring apparatus to which a microsphere is applied may be performed. According to the auto focusing method, the focus of the objective lens equipped with the microsphere may be controlled based on a reflection spectrum obtained by measuring light reflected from a sample surface. A spectrum may be obtained through a spectrometer while moving the objective lens on which the microsphere is mounted vertically downward from the above the sample surface, a light intensity function that changes with a distance from the sample surface may be obtained from the spectrum, and a focal position of the objective lens may be determined from a threshold value of the light intensity function.

Thus, the spectroscopic measuring apparatus may solve the problem of collision between the sample and the microsphere through 10 nm-level ultra-precise automatic focusing in a 100-nm-scale fine measurement area and may obtain a repeatable spectrum.

BRIEF DESCRIPTION OF THE DRAWINGS

Example embodiments will be more clearly understood from the following detailed description taken in conjunction with the accompanying drawings. FIGS. 1 to 14 represent non-limiting, example embodiments as described herein.

FIG. 1 is a block diagram illustrating a spectroscopic measuring apparatus in accordance with example embodiments.

FIG. 2 is an enlarged cross-sectional view illustrating portion 'A' in FIG. 1.

FIG. 3 is a block diagram illustrating the spectroscopic measuring apparatus of FIG. 1 wherein a first objective lens is selected.

FIG. 4 is a view illustrating an optical nanojet effect generated in a microsphere of the spectroscopic measuring apparatus of FIG. 1.

FIG. 5 is views illustrating a positional relationship between a microsphere, a sample and a virtual image and approximation to an optical lens.

FIG. 6 is a graph illustrating a spectrum of light intensity as a function of wavelength obtained through a spectrometer of the spectroscopic measuring apparatus of FIG. 1.

FIG. 8 is a view showing a 2D spectrum obtained while vertically scanning a second objective lens on which a microsphere is mounted.

FIG. 13 is a flowchart illustrating a method of inspecting a semiconductor device in accordance with example embodiments.

FIG. 14 is a flowchart illustrating a step of arranging a focal position in FIG. 13.

DETAILED DESCRIPTION OF EXAMPLE EMBODIMENTS

Hereinafter, example embodiments will be explained in detail with reference to the accompanying drawings.

Figure 1:
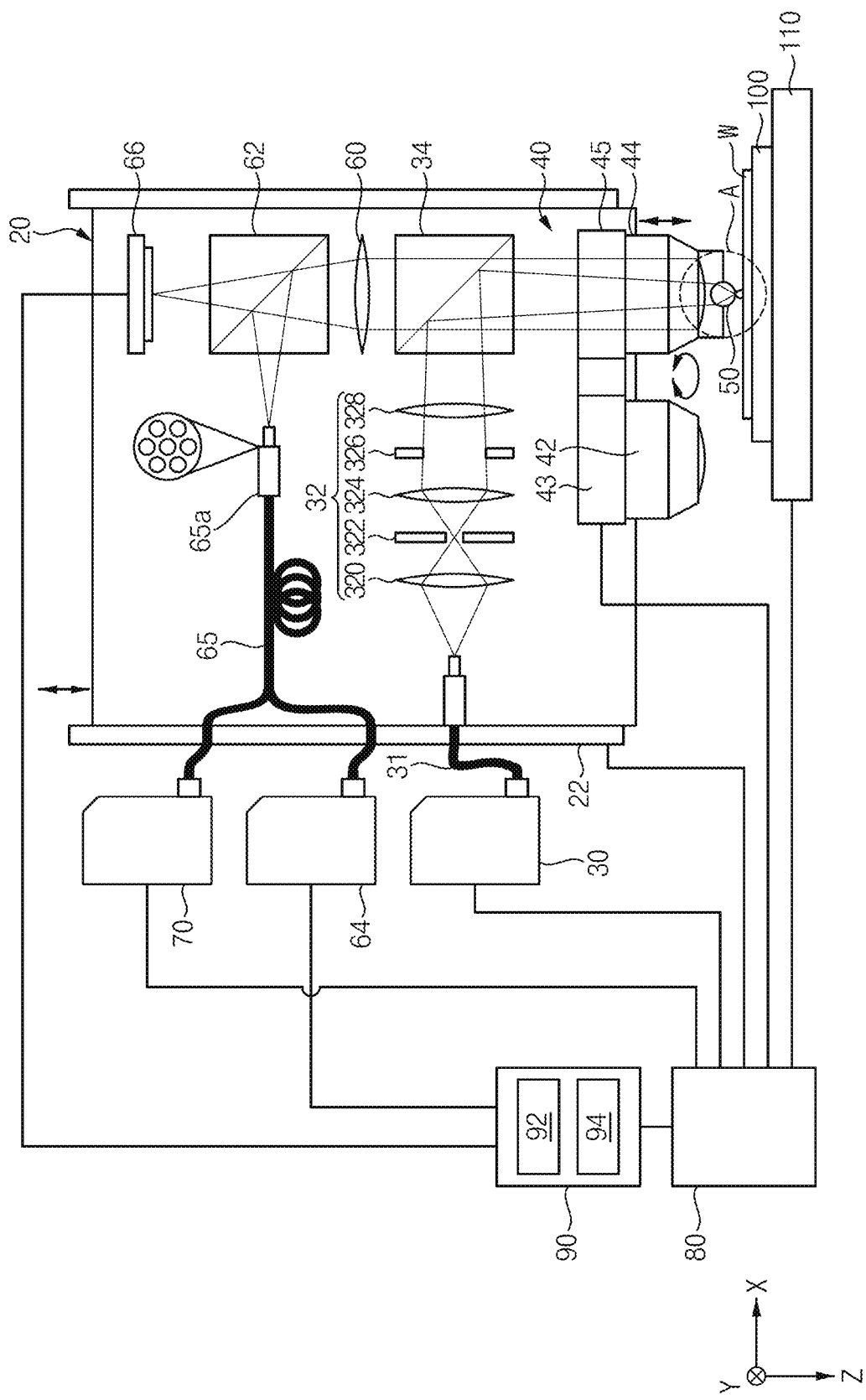
Figure 2:
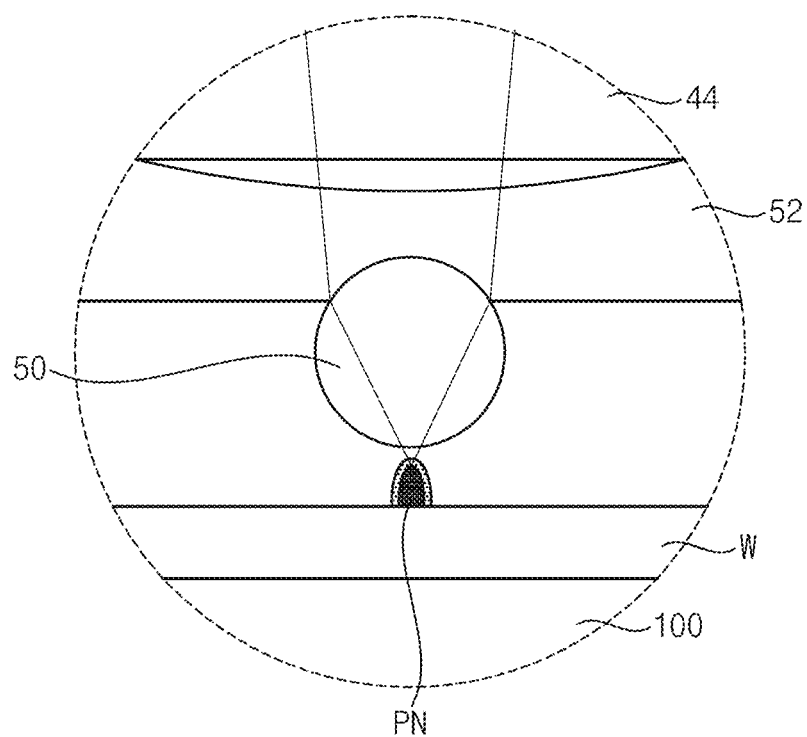
Figure 3:
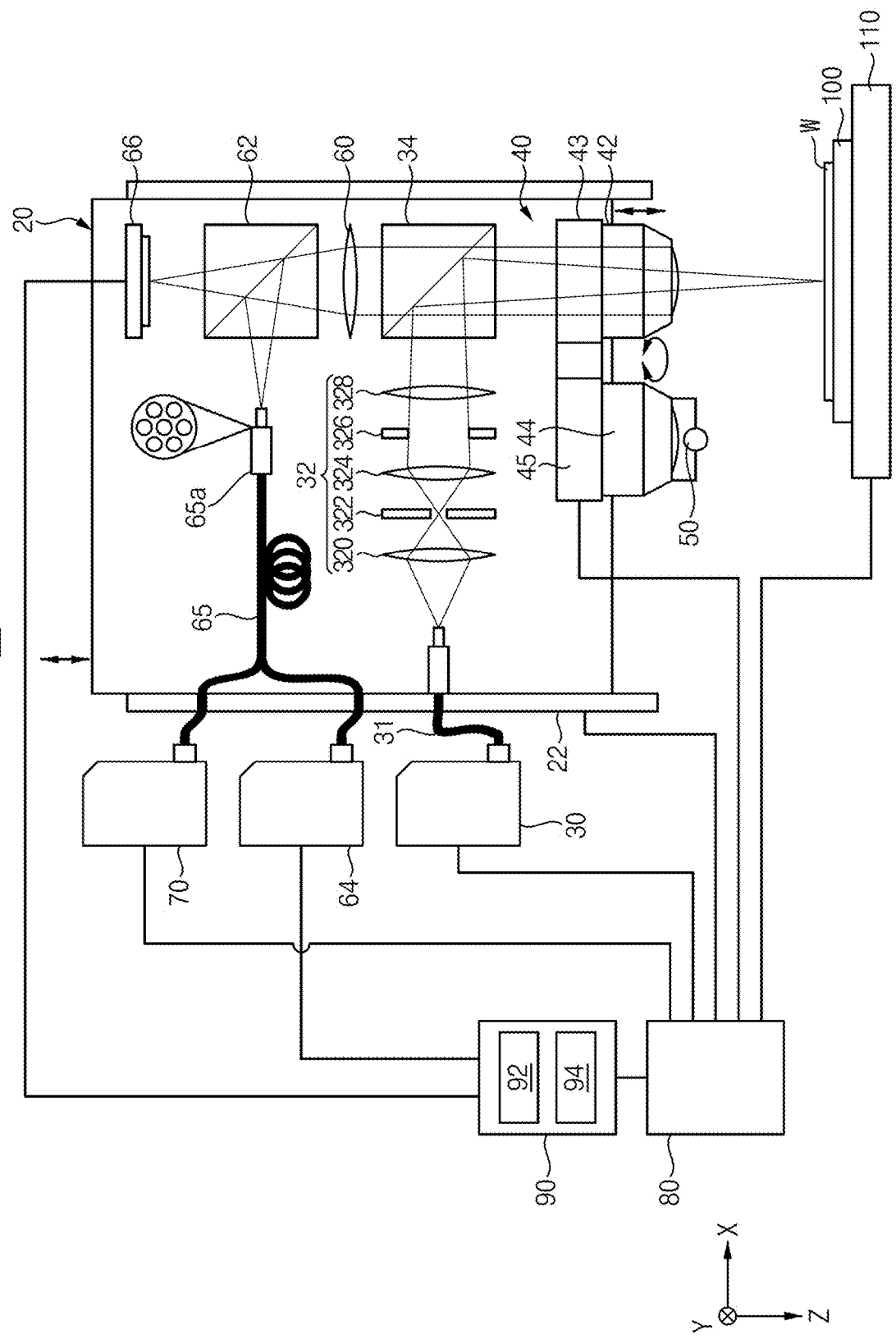
Figure 4:
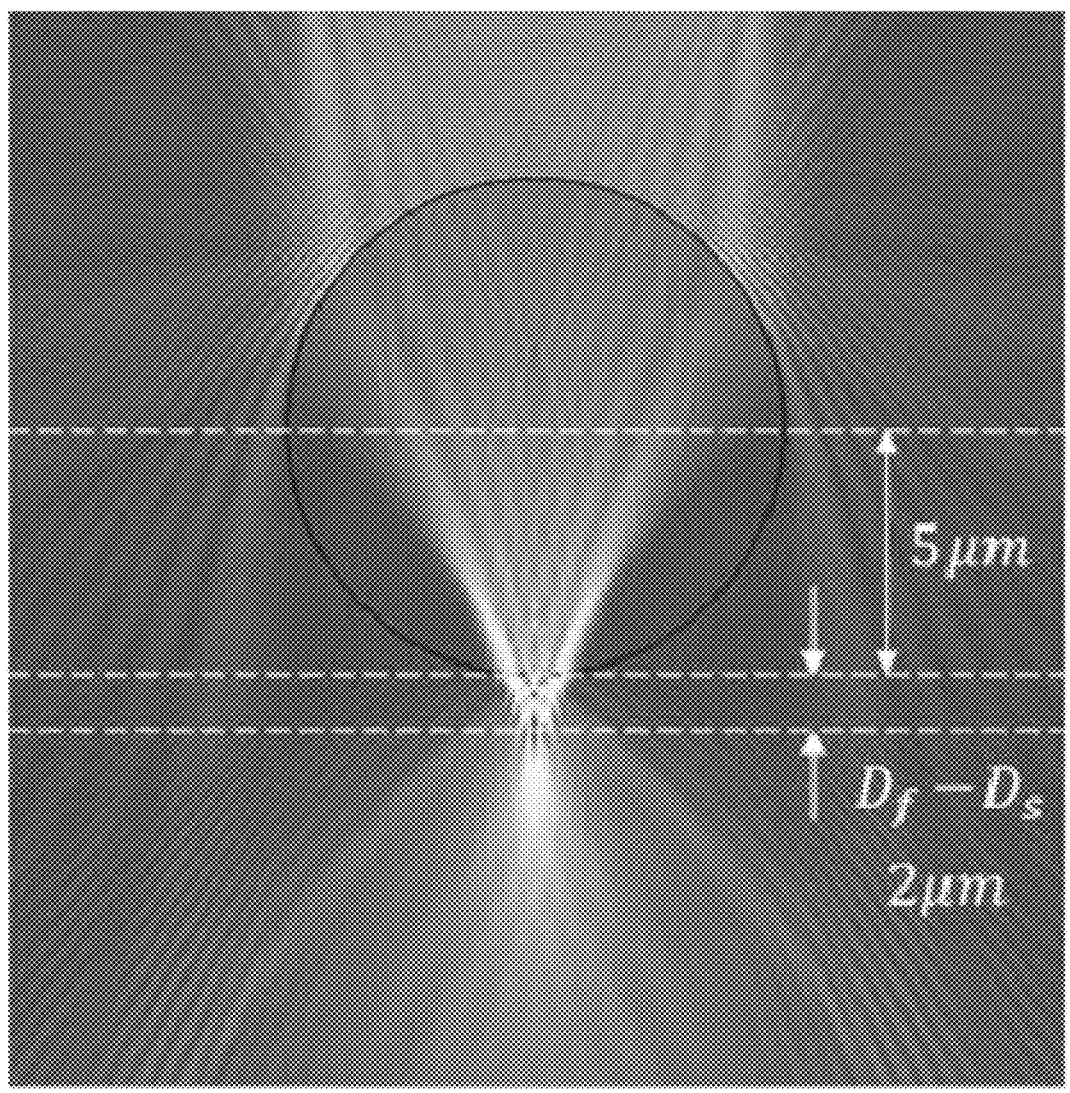
Figure 5:
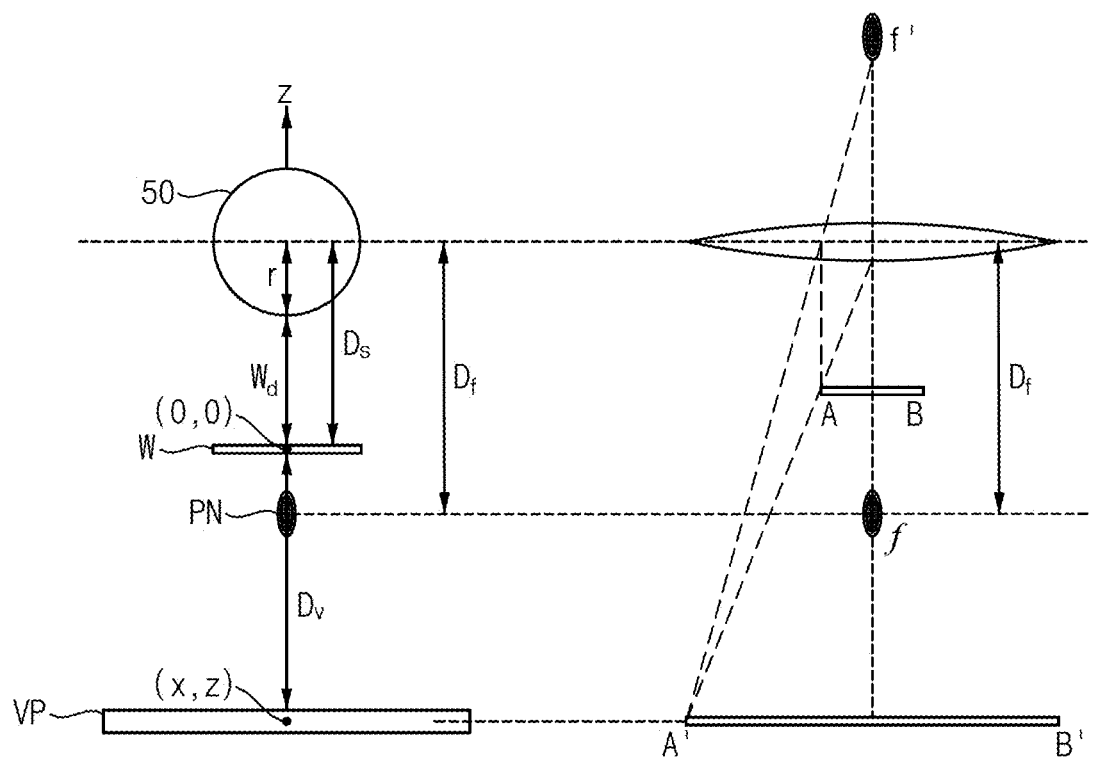
Figure 6:
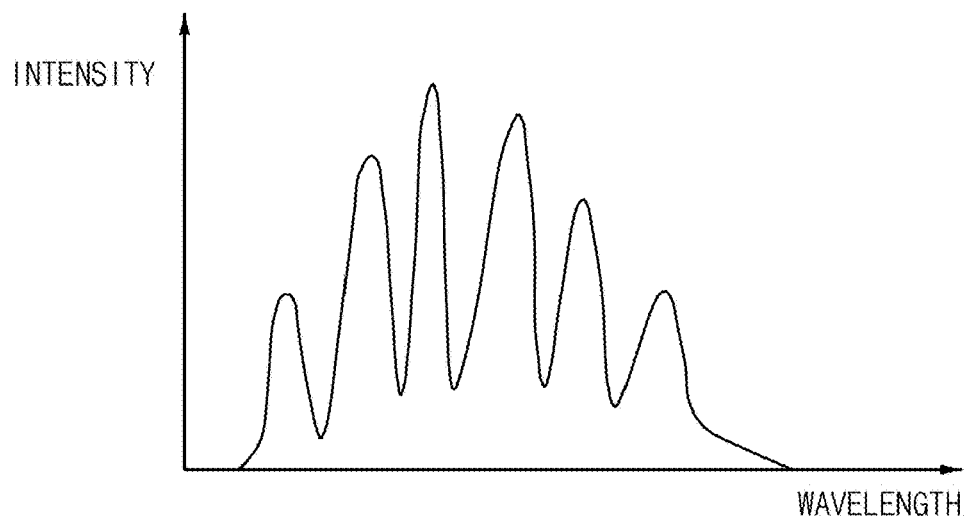

FIG. 1 is a block diagram illustrating a spectroscopic measuring apparatus in accordance with example embodiments. FIG. 2 is an enlarged cross-sectional view illustrating portion 'A' in FIG. 1. FIG. 3 is a block diagram illustrating the spectroscopic measuring apparatus of FIG. 1 wherein a first objective lens is selected. FIG. 4 is a view illustrating an optical nanojet effect generated in a microsphere of the spectroscopic measuring apparatus of FIG. 1. FIG. 5 is views illustrating a positional relationship between a microsphere, a sample and a virtual image and approximation to an optical lens. FIG. 6 is a graph illustrating a spectrum of light intensity as a function of wavelength obtained through a spectrometer of the spectroscopic measuring apparatus of FIG. 1.

Referring to FIGS. 1 to 6, a spectroscopic measuring apparatus 10 may include a light source 30, an illumination optical system 32, a beam splitter portion 34 and 62, an objective lens assembly 40 having a first objective lens 42 and a second objective lens 44 with a microsphere 50 mounted thereon, an imaging lens 60, a spectrometer 64 and an optical detector 66. In addition, the spectroscopic measuring apparatus 10 may further include a second light source 70, a controller 80, a processor 90 and a stage 100 configured to support a sample such as a semiconductor wafer W.

In example embodiments, the spectroscopic measuring apparatus 10 may be a super-resolution imaging system equipped with the microsphere 50. For example, the spectroscopic measuring apparatus 10 may irradiate a wafer surface with light of a broadband wavelength in order to obtain desired information on a miniaturized semiconductor structure, thickness, physical properties, overlay error, and the like. For example, the spectroscopic measuring apparatus 10 may be used as a spectroscopic reflectometer (SR) or a spectroscopic ellipsometry (SE) for measuring a pattern formed on a wafer W or a semiconductor device. The pattern may be a periodic pattern such as line-and-space (L/S) or an aperiodic pattern.

The wafer W may be a semiconductor substrate. For example, the semiconductor substrate may include silicon, strained Si, silicon alloy, silicon carbide (SiC), silicon germanium (SiGe), silicon germanium carbide (SiGeC), germanium, germanium alloy, gallium arsenide (GaAs), indium arsenide (InAs), III-V semiconductor, II-VI semiconductor, a combination thereof, or a laminate thereof. Additionally, if necessary, an organic plastic substrate other than a semiconductor substrate may be used.

In example embodiments, the spectroscopic measuring apparatus 10 may include a spectroscopic measurement portion configured to irradiate light onto a pattern to be inspected on the surface of the sample and receive light reflected from the surface to acquire and analyze a spectrum, and an auto focus control portion configured to control foci of the first and second objective lenses 42 and 44 based on the spectrum. As will be described later, in the entire optical system 20, the light source 30, the illumination optical system 32, the beam splitter portions 34 and 62, the objective lens assembly 40, the imaging lens 60 and the spectrometer 64 may be commonly used in the auto focus control portion and the spectroscopic measurement portion.

As illustrated in FIGS. 1 to 3, the light source 30 may be a broadband light source that generates and outputs broadband light including a plurality of wavelengths. The wavelength band of the light may vary according to a measurement object, a configuration of the optical system, etc., and may typically have a bandwidth from UV band to NIR band.

Light emitted from the light source 30 may pass through the illumination optical system 32 and may be incident to a first beam splitter 34 of the beam splitter portion. For example, the illumination optical system 32 may include a first lens 320, a second lens 324, a third lens 328, an aperture stop 322 between the first and second lenses 320 and 324, and a field stop 326 between the second and third lenses 324 and 328. The illumination optical system 32 may include a Köhler illumination system. However, it will be understood that the number of lenses included in the illumination optical system, the arrangement relationship, the configuration, and the like are not limited thereto.

The objective lens assembly 40 may be under the first beam splitter 34 to focus the light from the first beam splitter 34 and make it incident on the surface of the sample W. The imaging lens 60 may be above the first beam splitter 34, and may image the light that is reflected from the surface of the sample W and has passed through the objective lens assembly 40 and the first beam splitter 34, on the spectrometer 64 and the optical detector 66 through a second beam splitter 62. For example, the imaging lens 60 may include a tube lens.

In example embodiments, the objective lens assembly 40 may include the first objective lens 42 and the second objective lens 44 to which the microsphere 50 is mounted. The objective lens assembly 40 may include a lens turret on which the first objective lens 42 and the second objective lens 44 are mounted. The lens turret may be rotated or linearly moved to select one of the first objective lens 42 and the second objective lens 44. The objective lens assembly 40 may be controlled by a controller 80 to select one of the first and second objective lenses.

As illustrated in FIG. 2, the objective lens assembly 40 may include a support structure for fixing and supporting the microsphere 50. The support structure may be provided on a front surface of the second objective lens 44 and may include a transparent cover 52 to which the microsphere 50 is fixed. The support structure may have a housing structure that supports the microsphere 50 and surrounds an outer surface including a front surface of the second objective lens 44. The microsphere 50 may be spaced apart from the front surface of the second objective lens 44 by a predetermined distance with the transparent cover 52 interposed therebetween. The spacing distance between the microsphere 50 and the second objective lens 44 may be automatically or manually adjusted.

For example, the microsphere 50 may include soda lime glass (SLG), polystyrene (P S), or the like. The microsphere 50 may have a diameter of 1 μm to 100 μm.

When the second objective lens 44 equipped with the microsphere 50 is selected to be used, a magnification of up to several tens of times may be additionally obtained using a photonic nanojet effect generated from the microsphere 50 and spatial resolution may be improved. The magnification of the spectroscopic measuring apparatus 10 may be determined according to the diameter and material of the microsphere 50. A method of determining and controlling a function of the microsphere 50 and an optimal distance between the microsphere 50 and the sample W, that is, a focal length, will be described later.

Referring back to FIGS. 1 and 3, an imaging surface of the imaging lens 60 may be separated into two positions by the second beam splitter 62 of the beam splitter portion. For example, a portion of the light from the imaging lens 60 may be reflected by the second beam splitter 62 to be incident to a first imaging plane, and a remaining portion may transmit the second beam splitter 62 to be incident to a second imaging plane.

An optical fiber 65 may be optically coupled with the imaging lens 60. In particular, an input terminal 65a of the optical fiber 65 may be in the first imaging plane of the imaging lens 60, so that the image by the imaging lens 60 is on the input terminal 65a of the optical fiber 65. The spectrometer 64 may be at an output terminal of the optical fiber 65, and the light from the imaging lens 60 may be input to the spectrometer 64 through the optical fiber 65.

The optical detector 66 may be in the second imaging plane of the imaging lens 60. The optical detector 66 may include a camera for acquiring optical images of the sample surface. The camera may be a 2D array detector, and may be, for example, a CCD camera. It will be understood that the optical detector is not limited to the CCD camera. The optical detector 66 may be in the second image plane, which can play the same role as general microscope imaging, and it may be possible to confirm a measurement position within an object plane of the first objective lens 42 and an optical focal position in the direction of the optical axis. The optical detector 66 may detect a spot by the light source 30 and may be used to confirm a spot position of a measurement target portion of the sample W. The optical detector 66 may be used to determine a region of interest (ROI) when using the first objective lens 42.

In example embodiments, the spectroscopic measuring apparatus 10 may further include a second light source 70. In this case, the optical fiber 65 may have a branched optical fiber structure with one input terminal 65a and two output terminals. For example, the optical fiber 65 may have a Y-branched structure such as a reflection probe.

The input terminal 65a of the optical fiber 65 may be in the first image plane. The output terminal of the optical fiber 65 may include a first output terminal and a second output terminal. The spectrometer 64 may be at the first output terminal, and the second light source 70 may be at the second output terminal. The second light source 70 may be a light source for confirming a spot position. The second output terminal may be a term added for convenience as it is located in the opposite direction to the input terminal 65a, but from the point of view of the second light source 70, the second output terminal may be an input terminal and the input terminal 65a may be an output terminal.

In order to confirm the position of the spot, the light source 30 and the second light source 70 may be operated together. Light from the light source 30 may be condensed into a spot by the first and second objective lenses 42 and 44 and reflected from the sample W, so that it can be detected by the optical detector 66. On the other hand, light from the second light source 70 may be input through the second output terminal of the optical fiber 65, may be reflected from the sample W through the optical elements, and then passes through the optical elements again to be detected by the optical detector 66.

In FIGS. 1 and 3, small circles corresponding to a center spot and outer spots are illustrated together inside a large circle adjacent to the input terminal 65a of the optical fiber 65, and the center spot may be output to the spectrometer 64 as a spot by the light source 30 and the outer spots may be output to the second beam splitter 62 as spots by the second light source 70.

The spectrometer 64 may not operate in an operation of confirming the position of the spot using two types of spots through the optical fiber 65 together. Additionally, when measurement of the sample W is performed, the second light source 70 may not operate, and only the spectrometer 64 may operate. Meanwhile, when measurement of the measurement target W is performed, the optical detector 66 may selectively operate.

In example embodiments, the spectroscopic measuring apparatus 10 may include an optical system driver 22 for adjusting a position of the entire optical system 20, objective lens drivers 43 and 45 for precisely adjusting positions of the first and second objective lenses 42 and 44, and a stage driver 110. The objective lens driver may include a first objective lens driver 43 for precisely adjusting the position of the first objective lens 42 and a second objective lens driver 45 for precisely adjusting the position of the second objective lens 44. The objective lens driver may include a piezoelectric actuator such as a piezoelectric tube and may be used for auto focus control as will be described later.

For example, the position of the entire optical system 20 in the Z direction may be controlled by the optical system driver 22, and the positions of the first and second objective lenses 42 and 44 in the Z direction may be adjusted by the objective lens drivers 43 and 45. Operations of the drivers may be controlled by the controller 80.

A sample such as a wafer W may be supported on the stage 100. The stage driver 110 may move the stage 100 to a specific position during a measurement process. For example, the stage driver 110 may include a piezoelectric actuator such as a piezoelectric tube and may be used for auto focus control. The operation of the stage driver 110 may be controlled by the controller 80. Accordingly, the stage 100 may move the wafer W in a first direction (X direction), a second direction (Y direction) orthogonal to the first direction, or a third direction (Z direction) orthogonal to the first and second directions. In FIG. 1 and FIG. 3, the left and right direction of the paper is referred to as the X direction, the vertical direction of the paper is referred to as the Y direction, and the up and down direction of the paper is referred to as the Z direction.

The controller 80 may be connected to the light source 30, the second light source 70, the optical system driver 22, the objective lens drivers 43 and 45, and the stage driver 110 to control their operations. A processor 90 may receive a spectral signal from the spectrometer 64 and an optical image from the optical detector 66.

As illustrated in FIG. 6, the light incident through the optical fiber 65 may be converted into intensity for each wavelength in the spectrometer 64 and collected as data. The intensity data may be converted into an interpretable spectral signal. The converted spectral signal may be input to the processor 90.

The processor 90 may include a first processor 92 configured to interpret the spectral signal input from the spectrometer 64 in a measurement step. The input spectral signal may represent a structure of the measured point, and when the structure is changed, the spectral signal also changes into a different form. The first processor 92 may analyze the spectral signal to measure the structure of the measurement target. On the other hand, the analysis of the spectral signal may be generally performed using an analysis method through a matching comparison (fitting) of comparing a measured spectral signal with a simulated spectral signal and/or an artificial intelligence (AI) learning method.

The processor 90 may include a second processor 94 configured to determine and control an optimal distance between the microsphere and the sample, that is, the focal length, from the spectral signal input from the spectrometer 64 in a focus alignment step. As will be described later, the second processor 94 as the focus controller may output a focus alignment control signal for adjusting the focal position of the second objective lens 44 to which the microsphere 50 is mounted, to the controller 80, and the controller 80 may control the objective lens driver according to the focus alignment control signal to align the focus of the second objective lens 44.

The spectroscopic measuring apparatus 10 may arrange the second objective lens 44 equipped with the microsphere 50 as a microlens at an optimal position on the sample W to expand the imaging magnification, and then, may arrange the optical fiber 65 on the imaging plane with the magnification magnified to thereby precisely acquire a spectral signal in a very fine area. Further, the spectroscopic measuring apparatus 10 may automatically adjust a focal position of the second objective lens 44 to which the microsphere 50 is mounted, to thereby quickly and accurately measure the sample W and it may be possible to prevent an accident in which the second objective lens 44 on which the microsphere 50 is mounted collides with the sample W.

The spectroscopic measuring apparatus 10 may very accurately measure microstructures that cannot be measured by existing SE or SR-based measuring apparatus in a non-destructive manner, and accordingly, the yield of a semiconductor manufacturing line can be effectively managed. For example, the spectroscopic measuring apparatus 10 may be usefully utilized for measuring the locality within a cell area of DRAM or VNAND or for measuring the structure of a very narrow area of a memory device such as DRAM or a logic device such as SRAM. The observation area on the DRAM or VNAND may have a size of several tens of nanometers to several micrometers.

Hereinafter, the effect of the microsphere and the geometric relationship with the sample will be described.

As illustrated in FIG. 4, the optical nanojet effect by the microsphere 50 may be expressed by finite difference time domain method (FDTD) simulation. The focal point formed by the microsphere 50 may be positioned at a nearby point that is only a few microns away from the microsphere 50, and since the surface of the sample W should be positioned between the optical nanojet PN and the microsphere 50, the sample (W) may be actually positioned at a very close distance from the microsphere (50).

In FIG. 5, the drawing on the left shows a virtual image by the microsphere 50 and the drawing on the right shows an approximation to conventional ray optics using FDTD simulation. Although the optical nanojet effect shown in FIG. 4 is not completely explained by geometrical optics, the geometric relationship of the optical nanojet (PN) can be explained through FDTD simulation.

The geometric relationship between the microsphere 50, the sample W and the virtual image may be as follows. Dv is a distance between the imaginary plane (VP) and the sample (W), Ds is a distance between the center of the microsphere (50) and the sample (W), Df is a distance between the microsphere (50) and the optical nanojet (PN) obtained by FDTD simulation, and wd is a distance between the lower surface of the microsphere 50 and the sample (W).

The microsphere can behave as a thin lens with a single principal plane in the center. The back focal length and the front focal length of the microsphere 50 can be defined as f and f', respectively, by thin lens approximation. According to the geometric relationship, the magnification of the microsphere may be expressed as a ratio of $\overline{A'B'}$ and $\overline{AB}$.

For example, when the diameter of the microsphere 50 is 5 μm and the refractive index of the microsphere 50 is 1.6, since the distance from the lower surface of the microsphere 50 to the optical nanojet PD (Df-Ds) appears at the level of 2 the microsphere 50 and the sample W may be positioned at a distance closer than 2 μm.

When a spectrum is obtained using the second objective lens 44 to which the microsphere 50 are applied, multiple reflections occurring in the microsphere may occur. The microsphere may be an optical component to which an antireflection coating is difficult to apply due to their small size. Accordingly, multiple reflections may occur inside and outside the microsphere, making focus alignment difficult. Since the microsphere and the sample are located very close to each other, interference may occur due to the multiple reflections between them, and the spectrum obtained by the spectrometer 64 may change very sensitively to the distance between the microsphere and the sample.

The accuracy of adjusting the distance between the microsphere and the sample may be a factor that greatly affects the simulation consistency and repeatability of the reflection spectrum. Unlike image acquisition, spectral-based sample inspection and measurement may require nm-level focus alignment technology.

Hereinafter, a method for determining and controlling the optimal distance between the microsphere and the sample, that is, the focal length, will be described.

FIGS. 7A to 7D are cross-sectional views illustrating a process of aligning the focus of the second objective lens on which a microsphere is mounted.

Figure 7A:
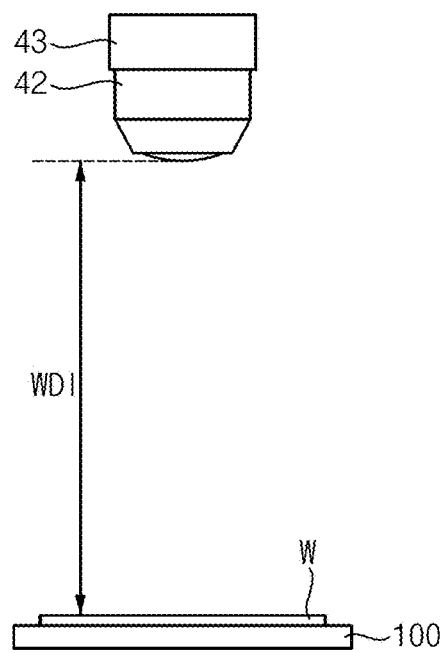
FIGS. 7A to 7D are cross-sectional views illustrating a process of aligning the focus of the second objective lens on which a microsphere is mounted.

Referring to FIG. 7A, a region of interest (ROI) on the surface of the sample W may be set using the first objective lens 42 to which the microsphere 50 is not mounted. An optical image may be obtained by receiving reflected light from the surface of the sample W through the first objective lens 42 and capturing the received reflected light with a camera of the optical detector 66.

The focal position of the first objective lens 42 may be determined at a position corresponding to the working distance WD1 of the first objective lens 42 by using the optical image acquired by the optical detector 66. At this time, the region of interest (ROI) may be located outside a region magnified by the second objective lens 44 on which the microsphere 50 is mounted. That is, the first objective lens 42 is positioned above the sample W, and the second objective lens 44 is not positioned above the sample W.

Figure 7B:
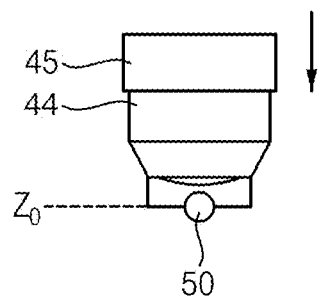

Referring to FIG. 7B, the lens turret of the objective lens assembly 40 may be driven to convert from the first objective lens 42 to the second objective lens 44, and the second objective lens 44 may be moved to an initial position (Z0) that is above the sample W.

In consideration of the working distance WD1 of the first objective lens 42, the second objective lens 44 may be moved vertically downward to the initial position Z0 that is spaced from the focal position of the first objective lens 42 by a predetermined distance. The predetermined distance may be within a range of several tens of μm. Accordingly, the initial position Z0 of the second objective lens 44 may be a predetermined distance, such as within a range of several tens of μm, from the working distance WD1 of the first objective lens 42.

Figure 7C:
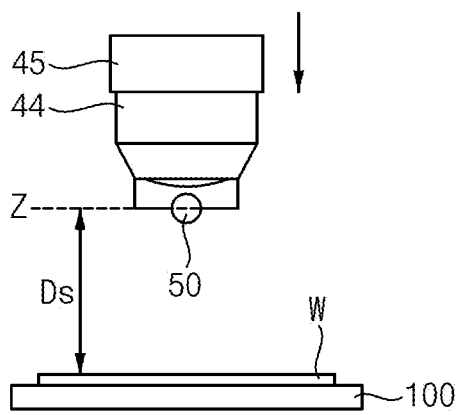

Referring to FIG. 7C, a spectrum may be obtained while moving the second objective lens 44 vertically downward. The second objective lens 44 may be finely moved vertically downward by using the second objective lens driver 45 including a piezoelectric actuator such as a piezoelectric tube. For example, the second objective lens 44 may be moved toward the sample W at intervals of several nm (10 nm or less). At this time, the light intensity spectrum that changes as a function of the wavelength and the height (Z) may be obtained through the spectrometer 64 in real time. In addition, a light intensity function that changes with a distance from the surface of the sample W and a derivative of the light intensity function may be obtained from the spectrum.

Moving the second objective lens 44 vertically downward may mean reducing the distance between the microsphere 50 and the sample W. In another embodiment, the spectrum may be obtained while maintaining the position of the second objective lens 44 and moving the stage 100 vertically upward. In this case, the stage 100 may be finely moved vertically upward using the stage driver 110 including a piezoelectric actuator such as a piezoelectric tube.

Figure 7D:
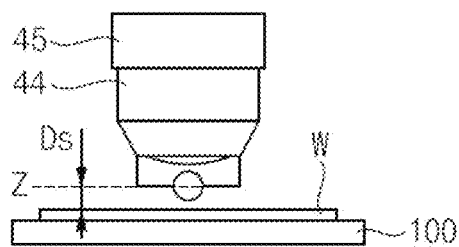

Referring to FIG. 7D, when the light intensity function reaches a predetermined threshold value or a position set based on the threshold value, the current position of the second objective lens 44 may be determined as a focal position, and vertical movement of the second objective lens 44 may be stopped.

Figure 8:
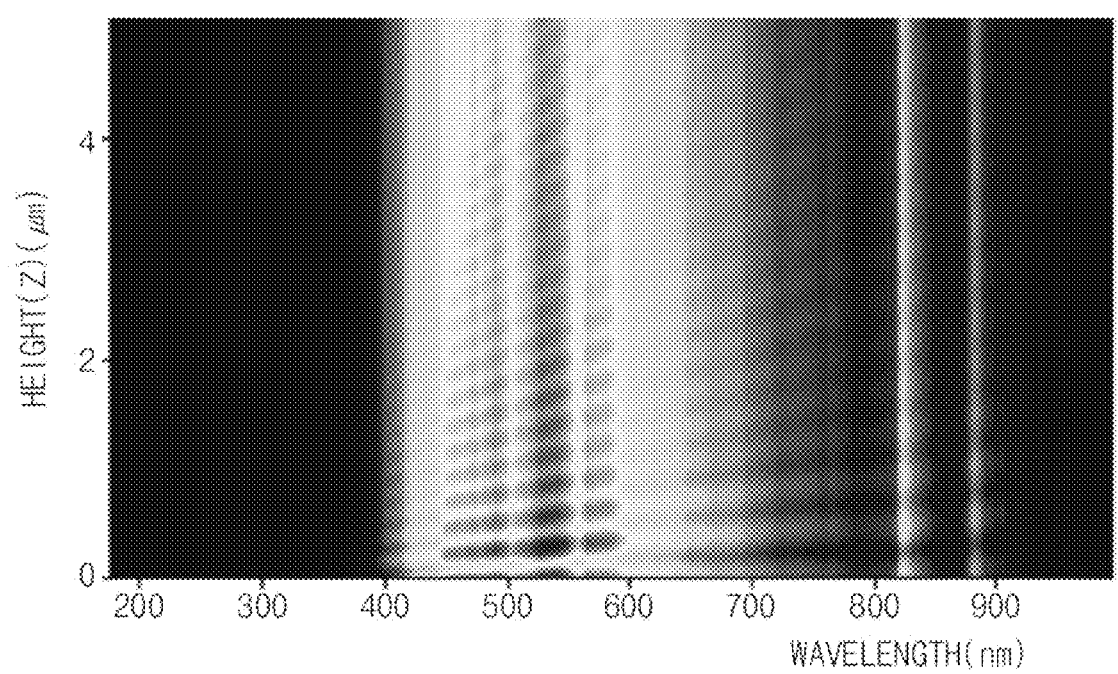

FIG. 8 is a view showing a 2D spectrum obtained while vertically scanning a second objective lens on which a microsphere is mounted.

Referring to FIG. 8, since the microsphere 50 does not have an antireflection coating, a two-dimensional spectrum as a function of wavelength and height may be obtained while changing its position in the vertical direction (Z direction). The pattern appearing in the lateral direction change may be a pattern appearing due to the structure of the sample (W), and the pattern in the vertical and oblique directions may be an interference pattern due to multiple reflections between the microsphere and the sample.

As the microsphere and the sample become closer, the wavelength dependence of the corresponding pattern may decrease. As the height Z is gradually decreased, when the optical path difference between the microsphere and the sample is λ/4, the last destructive interference occurs, and after passing this position, a section in which the microsphere has a high risk of colliding with the sample may begin. In order to prevent such a collision in the section, the focal length of the microsphere may be calculated in a quicker and simpler way by setting the light intensity function and the threshold value of the light intensity function.

The light intensity function may be calculated as a focus alignment function (f) for integrating the two-dimensional spectrum within a predetermined wavelength range by Equation (1) below.

$$f(z) = \int_{\lambda_i}^{\lambda_f} \rho(\lambda) I(z,\lambda) d\lambda \qquad \text{Equation (1)}$$

Where, I(z,λ) may be intensity as a function of wavelength, and ρ(λ) may be a weight function.

The weight function p may be selected to correct a brightness difference as a function of wavelength. For example, the weight function p may have a constant value. The predetermined wavelength may be within a range of 400 nm to 820 nm. The weight function p and the integration interval may be set differently depending on the light source, the sample to be measured, SNR of the optical system, etc.

The threshold value may be determined based on a position closest to the sample surface from a plurality of positions where destructive interference occurs when the second objective lens 44 is moved toward the surface of the sample W. The final destructive interference pattern may be reflected as the minimum value of the focus alignment function (f), and a position at which the microsphere is closest enough to collide with the sample may be determined as the focal position.

As shown in FIG. 8, it can be seen that the position where the multiple reflection effect is least reflected in the spectrum is the position where the microsphere is closest to the sample. Accordingly, the above-described focus alignment method may have an effect of removing spectrum changes due to unwanted multi-reflection.

Figure 9A:
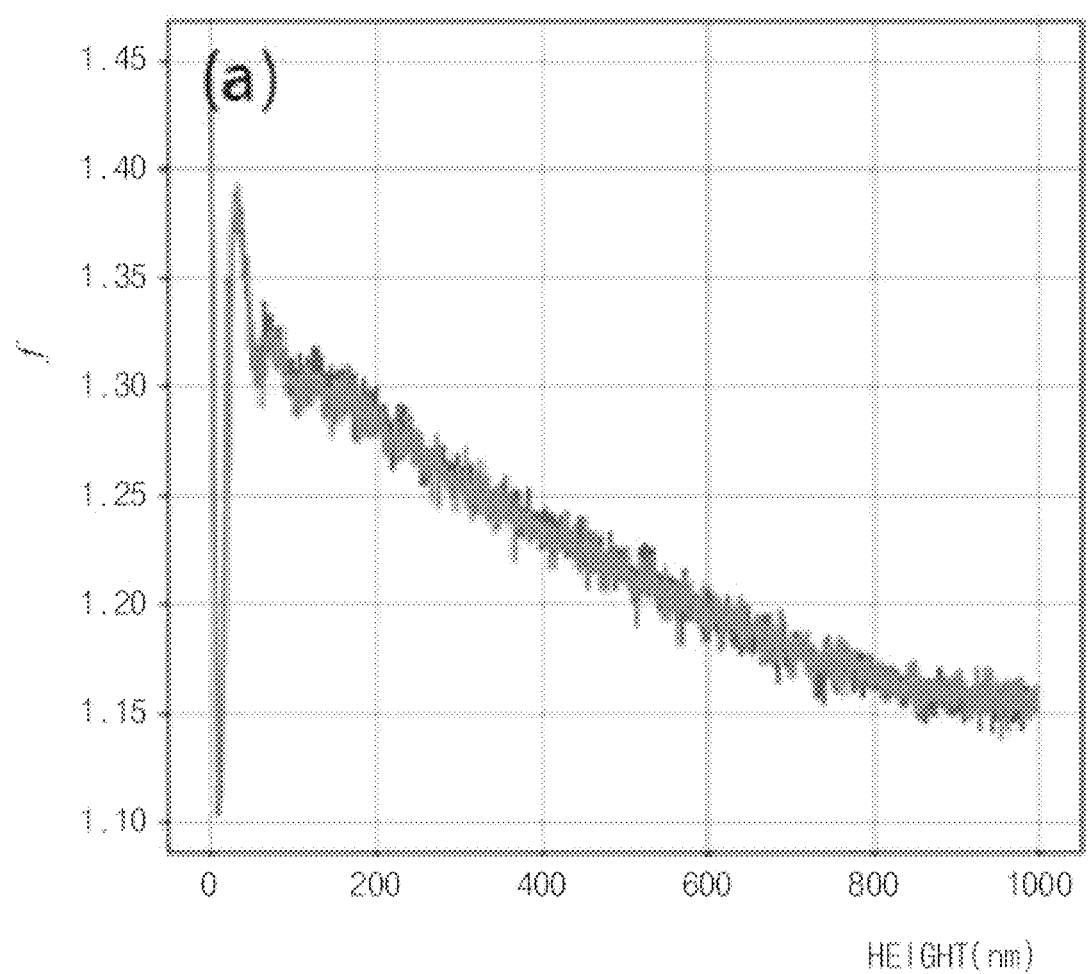
FIG. 9A are graphs showing a focus alignment function calculated from the two-dimensional spectrum of FIG. 8 obtained for different samples.
Figure 9B:
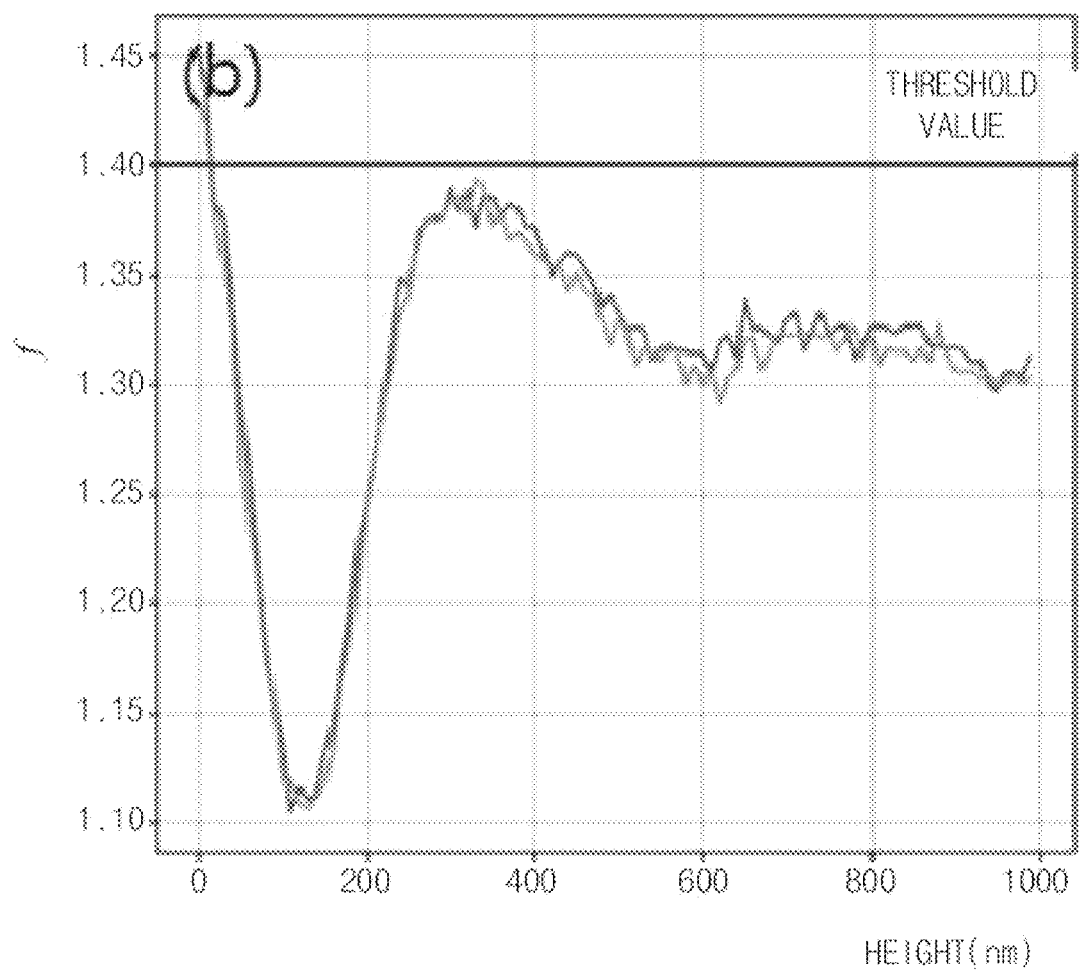
FIG. 9B is enlarged graphs showing a focus proximity position including a threshold value of the focus alignment function of FIG. 9A.
Figure 10A:
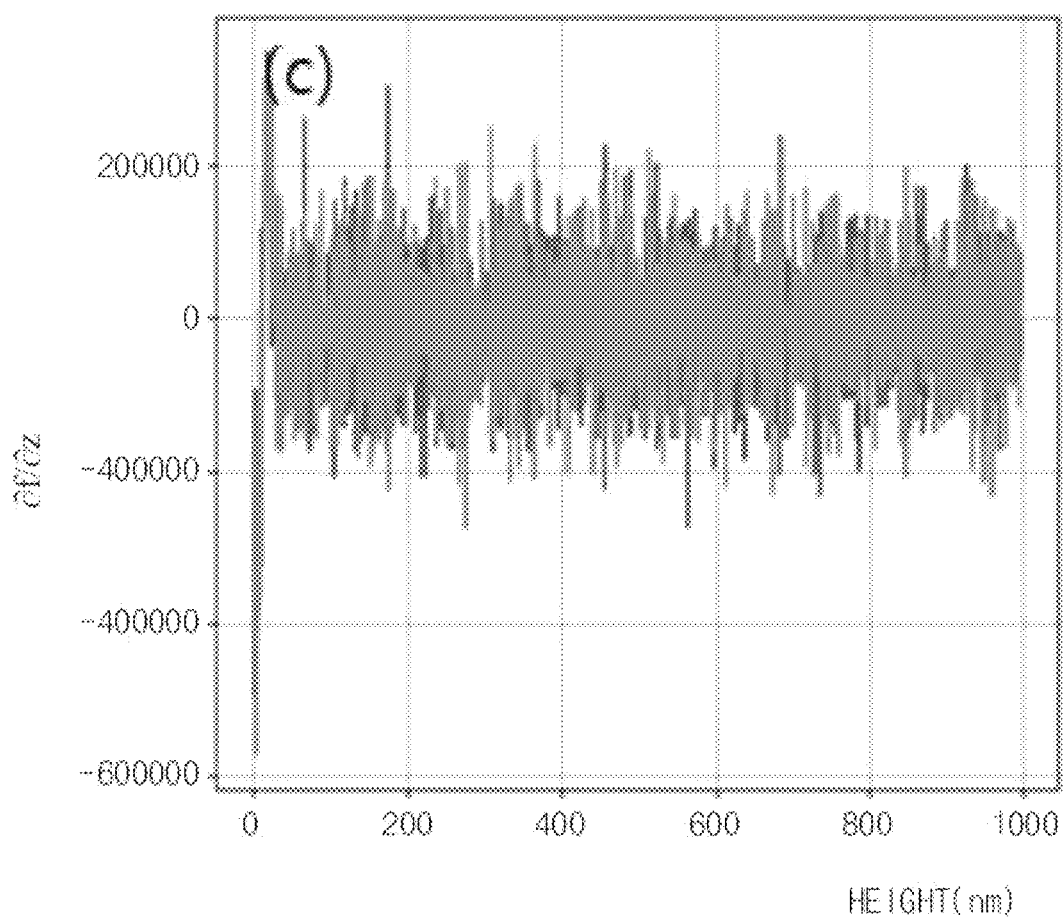
FIG. 10A is graphs showing the derivative of the focus alignment function of FIG. 9A.
Figure 10B:
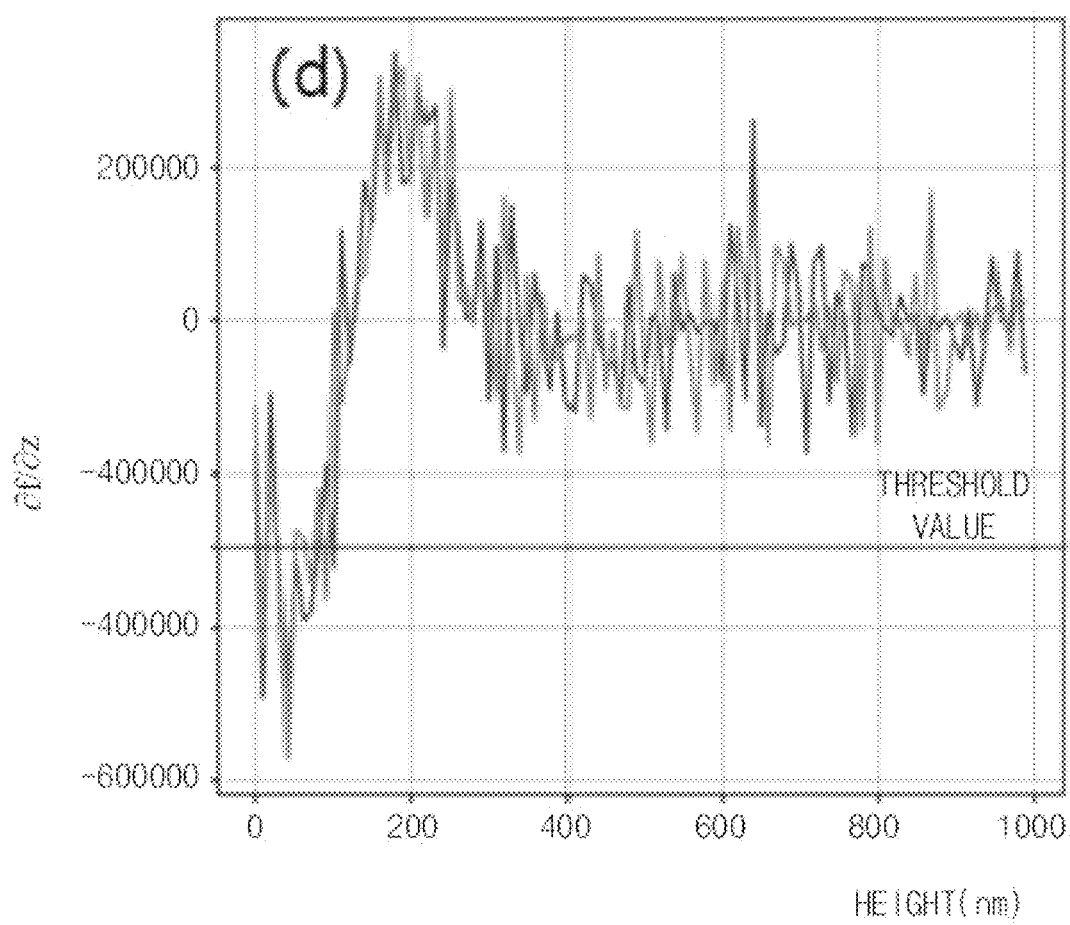
FIG. 10B is enlarged graphs showing a focus proximity position including a threshold value of the derivative of FIG. 10B.

FIG. 9A are graphs showing a focus alignment function calculated from the two-dimensional spectrum of FIG. 8 obtained for different samples, and FIG. 9B is enlarged graphs showing a focus proximity position including a threshold value of the focus alignment function of FIG. 9A. FIG. 10A is graphs showing the derivative of the focus alignment function of FIG. 9A, and FIG. 10B is enlarged graphs showing a focus proximity position including a threshold value of the derivative of FIG. 10B.

Referring to FIGS. 9A to 9D, two focus alignment functions (f) and their derivatives ∂f/∂z may be obtained from two different samples (#1, #2) while scanning a 10 μm range during autofocus alignment. The weight function ρ may be a constant, and the integration range may be in a range of 415 nm to 809 nm.

As can be seen in FIG. 9B, the focus alignment function (f) may be maximized at the focal position. In addition, it may be possible to check the minimum value before the focal position, and it can be seen that a section with high collision risk between the microsphere and the sample begins from the corresponding position. The derivative (∂f/∂z) may provide useful information for specifying the position of the microsphere relative to the threshold.

Figure 11A:
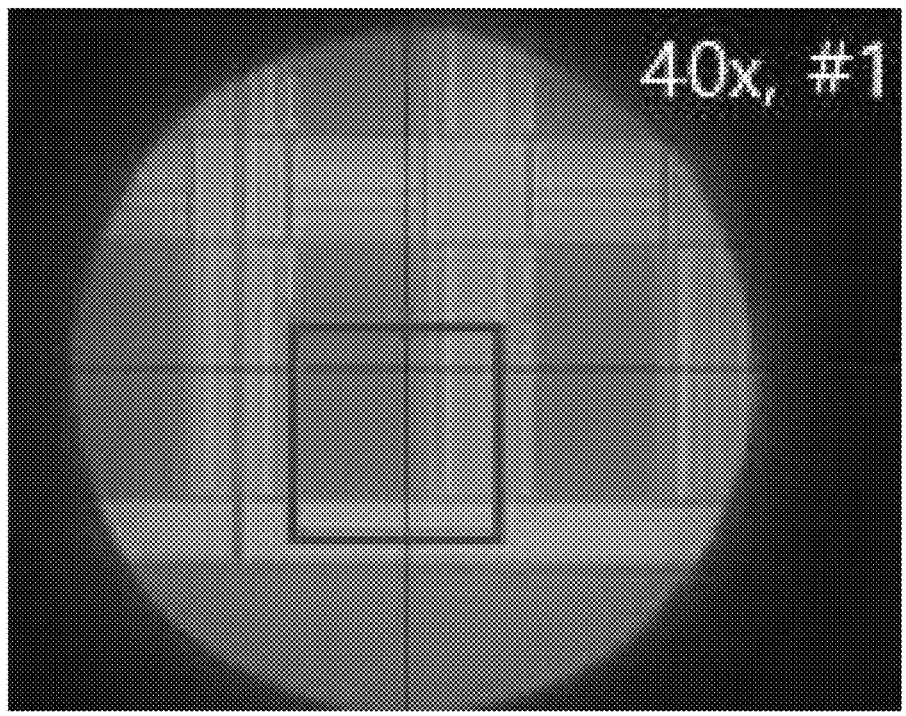
FIGS. 11A and 11B are views illustrating optical images respectively obtained through a first objective lens and a second objective lens at a first sample position.
Figure 11B:
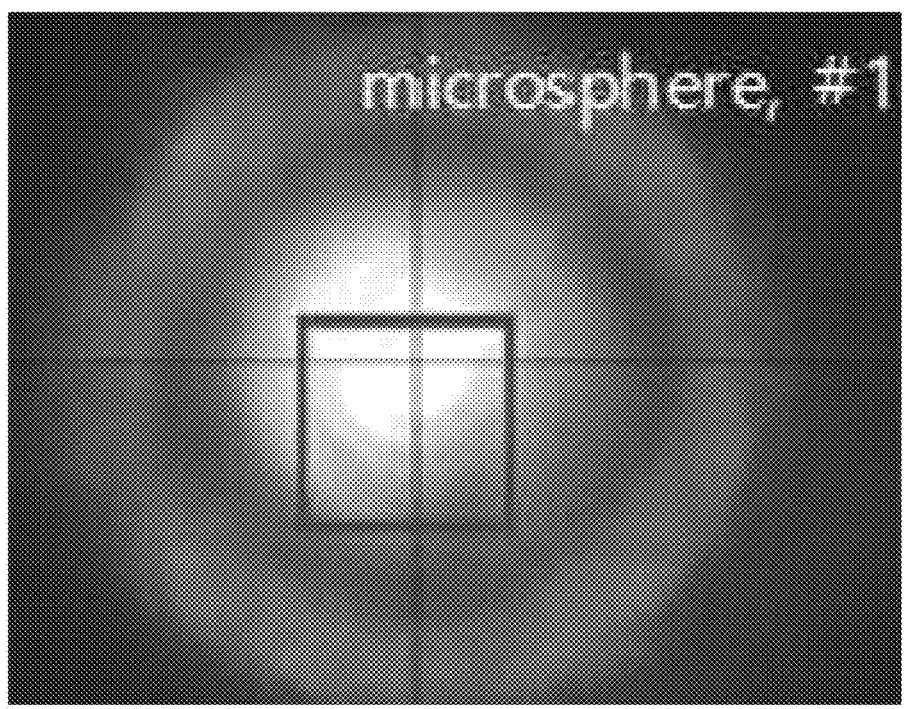
Figure 12A:
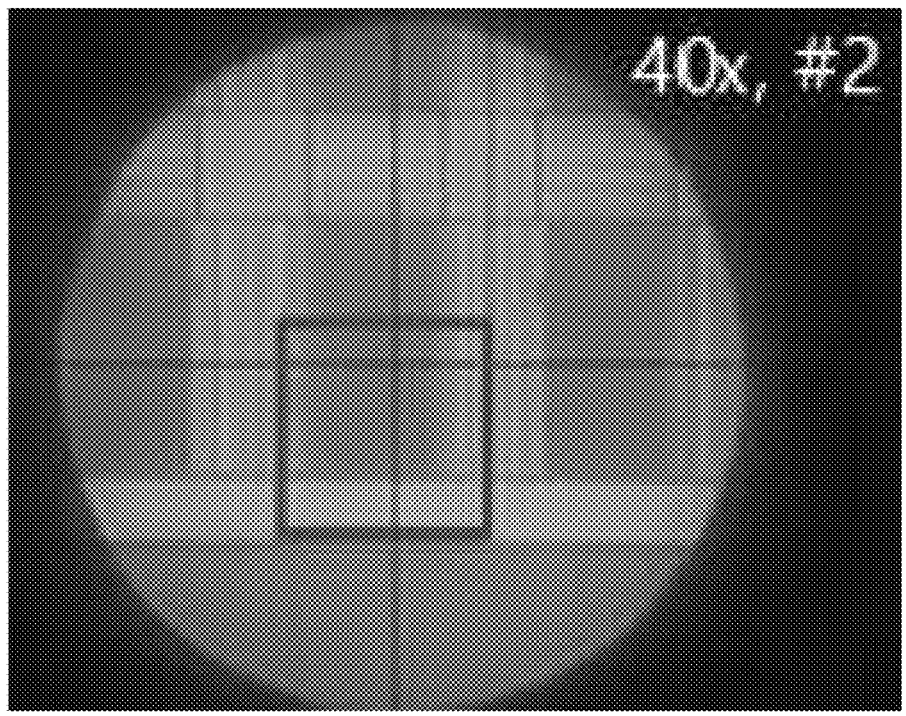
Figure 12B:
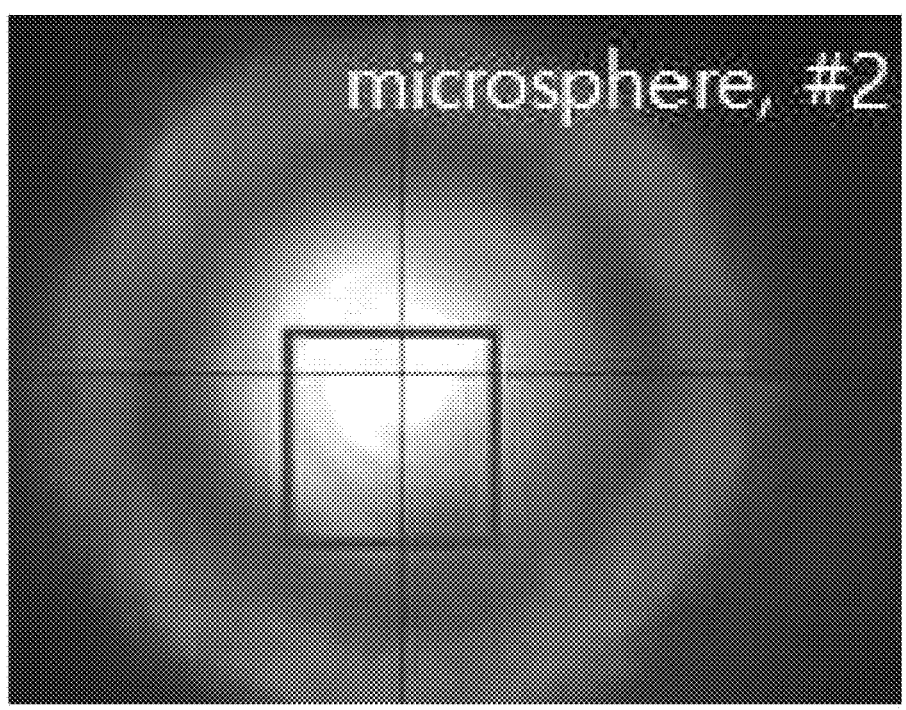
FIGS. 12B and 12B are views illustrating optical images respectively obtained through a first objective lens and a second objective lens at a second sample position.

FIGS. 11A and 11B are views illustrating optical images respectively obtained through a first objective lens and a second objective lens at a first sample position. FIGS. 12B and 12B are views illustrating optical images respectively obtained through a first objective lens and a second objective lens at a second sample position.

Referring to FIGS. 11A to 12B, autofocus alignment was performed on different first and second samples #1 and #2d to obtain optical images at respective focal positions. As can be seen in FIGS. 11B and 12B, both measurements confirm that the microspheres are in close proximity to the sample surface. The interference pattern found at the center of the microsphere means that the microsphere is close enough to almost touch the sample surface. In addition, since almost the same images can be obtained in the two measurements, it can be seen that reproducible positioning of the microsphere, that is, focus alignment, is possible through the above-described focus alignment method.

Moreover, it can be seen that the auto focus alignment method secured accuracy and repeatability of 10 nm or less. Through the above-described measurements, it may be possible to secure a spectrum for each position from a position where the sample and the microsphere are in close proximity to a point sufficiently far apart, and collision between the microsphere and the sample may be prevented.

Hereinafter, a method of inspecting a semiconductor device using the above-described spectroscopic measuring apparatus will be described.

Figure 13:
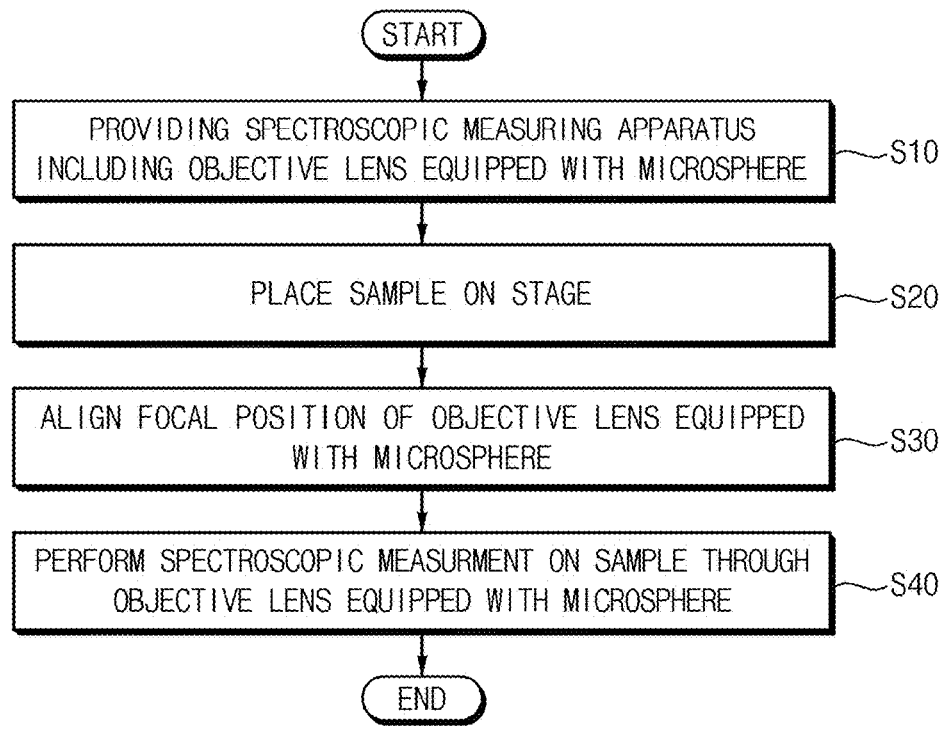
Figure 14:
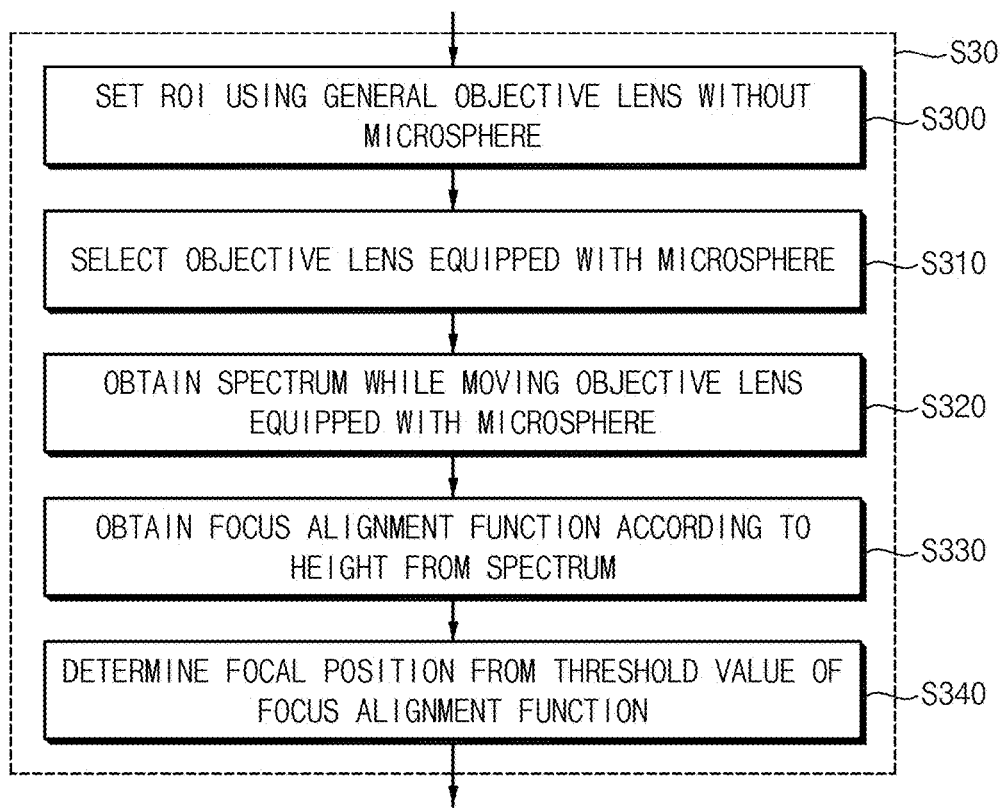

FIG. 13 is a flowchart illustrating a method of inspecting a semiconductor device in accordance with example embodiments. FIG. 14 is a flowchart illustrating a step of arranging a focal position in FIG. 13.

Referring to FIGS. 13 and 14, a spectroscopic measuring apparatus 10 having a first objective lens 42 and a second objective lens 44 equipped with a microsphere 50 may be provided (S10), and a sample W such as a semiconductor substrate may be placed on a stage 100 (S20).

In example embodiments, a semiconductor wafer or semiconductor device may be on the stage 100 of the spectroscopic measuring apparatus 10. A periodic pattern such as a line-and-space (L/S) or an aperiodic pattern may be formed on a surface of the wafer or the semiconductor device.

Then, a focal position of the second objective lens 44 to which the microsphere 50 is mounted may be aligned (S30).

In particular, a region of interest (ROI) may be set using a general objective lens 42 that does not include the microsphere (S300).

Reflected light from the surface of the sample W may be received through the first objective lens 42 and the received light may be captured with a camera of an optical detector 66 to obtain an optical image. A focal position of the first objective lens 42 may be determined at a position corresponding to the working distance WD1 of the first objective lens 42 by using the optical image acquired by the optical detector 66.

Then, the second objective lens 44 to which the microsphere 50 is mounted may be selected (S310), and a spectrum may be obtained while moving the second objective lens 44 vertically downward (S320).

The lens turret of the objective lens assembly 40 may be driven to convert from the first objective lens 42 to the second objective lens 44, and the second objective lens 44 may be moved to an initial position Z0.

The spectrum may be obtained while moving the second objective lens 44 vertically downward. The second objective lens 44 may be finely moved vertically downward by using the second objective lens driver 45 including a piezoelectric actuator such as a piezoelectric tube. For example, the second objective lens 44 may be moved toward the sample W at intervals of several nm.

A focus alignment function (f) as a function of height may be obtained from the spectrum (S330), and a focal position may be determined from a threshold value of the focus alignment function (S340).

While finely moving the second objective lens 44 vertically downward, the light intensity spectrum as a function of the wavelength and the height Z may be obtained through the spectrometer 64 in real time. From the spectrum, the focus alignment function (f) as a function of a distance from the surface of the sample (W) and a derivative (∂f/∂z) of the focus alignment function may be obtained.

When the focus alignment function f reaches a predetermined threshold value or a position set based on the threshold value, the position may be determined as a focal position, and the second objective lens 44 can be stopped. Accordingly, the focal position of the second objective lens 44 may be aligned.

After auto focus alignment of the second objective lens, spectroscopic measurement of the sample W may be performed through the second objective lens 44 (S40).

First, light from the light source 30 of the spectroscopic measuring apparatus 10 may be irradiated onto the sample W. The Light from the light source 30 may be reduced to a very small spot size through the second objective lens 44 to which the microsphere 50 is mounted, and then, may be irradiated to the sample surface.

Then, in the spectrometer 64, a spectral signal of the sample surface may be obtained. The light reflected from the sample surface may be incident to the spectrometer 64 through the optical elements, and may be separated by the spectrometer 64 to obtain a spectrum.

The first processor 92 may obtain and analyze the spectral signal from the spectrometer 64 to determine whether the sample W is normal. For the analysis of the spectral signal, an interpretation method through consistency comparison of comparing the measured spectral signal with a simulated spectral signal and/or an interpretation method using an artificial intelligence (AI) learning method may be used.

As mentioned above, an ultra-precise auto focusing method corresponding to the spectroscopic measuring apparatus 10 to which the microsphere 50 is applied may be performed. The spectroscopic measuring apparatus 10 may solve the problem of collision between the sample and the microsphere through 10 nm-level ultra-precise automatic focusing in a 100-nm-scale fine measurement area and may obtain a repeatable spectrum.

The above-described spectroscopic measuring apparatus may be used to manufacture a semiconductor package including a logic device or a memory device. The semiconductor package may include semiconductor devices such as logic devices or memory devices. The semiconductor package may include logic devices such as central processing units (CPUs), main processing units (MPUs), or application processors (APs), or the like, and volatile memory devices such as DRAM devices, HBM devices, or non-volatile memory devices such as flash memory devices, PRAM devices, MRAM devices, ReRAM devices, or the like.

The foregoing is illustrative of example embodiments and is not to be construed as limiting thereof. Although a few example embodiments have been described, those skilled in the art will readily appreciate that many modifications are possible in example embodiments without materially departing from the novel teachings and advantages of the present invention. Accordingly, all such modifications are intended to be included within the scope of example embodiments as defined in the claims.

What is claimed is:

1. A method of inspecting a semiconductor device, comprising:
    providing a spectroscopic measuring apparatus having a first objective lens and a second objective lens, wherein the second objective lens has a microsphere thereon;
    placing a semiconductor substrate on a stage;
    obtaining a spectrum while moving the second objective lens vertically downward;
    obtaining a light intensity function that changes with a distance from a substrate surface from the spectrum;
    determining a focal position of the second objective lens from a threshold value of the light intensity function;
    setting a region of interest on the substrate surface using the first objective lens when the first objective lens is positioned above the substrate surface; and
    changing from the first objective lens to the second objective lens such that the second objective lens is positioned above the substrate surface.

2. The method of claim 1, wherein setting the region of interest on the substrate surface includes:
    receiving reflected light from the substrate surface through the first objective lens; and
    obtaining an optical image by capturing the reflected light that is received through the first objective lens with a camera.

3. The method of claim 1, further comprising:
    moving the second objective lens vertically downward to an initial position that is spaced apart by a predetermined distance from a focal position of the first objective lens.

4. The method of claim 1, wherein obtaining the light intensity function that changes with the distance to the substrate surface includes calculating a focus alignment function (f) that integrates the spectrum within a predetermined wavelength range by Equation (1), $$f(z) = \int_{\lambda_i}^{\lambda_f} \rho(\lambda) I(z,\lambda) d\lambda \qquad \text{Equation (1)}$$

where, $I(z,\lambda)$ is intensity as a function of wavelength, and $\rho(\lambda)$ is a weight function.

5. The method of claim 4, wherein the threshold value of the light intensity function is selected to be a minimum value of the focus alignment function.

6. The method of claim 4, wherein the weight function ($\rho$) is selected to correct a brightness difference as a function of wavelength.

7. The method of claim 4, wherein the predetermined wavelength range is within a range of 400 nm to 820 nm.

8. The method of claim 1, wherein determining the focal position of the second objective lens from the threshold value of the light intensity function includes:
    determining the threshold value based on a position of the second objective lens that is closest to the substrate surface from a plurality of positions where destructive interference occurs when the second objective lens is moved toward the sample surface.

9. The method of claim 1, wherein moving the second objective lens vertically downward includes moving the second objective lens toward the substrate surface using a piezoelectric actuator.

10. A method of inspecting a semiconductor device, comprising:
    providing a spectroscopic measuring apparatus having a first objective lens and a second objective lens, wherein the second objective lens has a microsphere thereon;
    placing a semiconductor substrate on a stage;
    aligning a focal position of the second objective lens; and
    receiving reflected light from a surface of the semiconductor substrate through the second objective lens; and
    obtaining a spectrum from the received reflected light,
    wherein aligning the focal position of the second objective lens includes:
    obtaining a spectrum while moving the second objective lens vertically downward;
    obtaining a light intensity function that changes with a distance from the surface of the semiconductor substrate from the spectrum; and
    determining the focal position of the second objective lens from a threshold value of the light intensity function,
    wherein aligning the focal position of the second objective lens includes:
    setting a region of interest on the surface using the first objective lens when the first objective lens is positioned above the surface; and
    changing from the first objective lens to the second objective lens such that the second objective lens is positioned above the surface.

11. The method of claim 10, wherein obtaining the light intensity function that changes with the distance from the surface includes calculating a focus alignment function (f) that integrates the spectrum within a predetermined wavelength range by Equation (1), $$f(z) = \int_{\lambda_i}^{\lambda_f} \rho(\lambda) I(z,\lambda) d\lambda \qquad \text{Equation (1)}$$

where, $I(z,\lambda)$ is intensity as a function of wavelength, and $\rho(\lambda)$ is a weight function.

12. The method of claim 11, wherein the threshold value of the light intensity function is selected to be close to a minimum value of the focus alignment function.

13. The method of claim 10, wherein determining the focal position of the second objective lens from the threshold value of the light intensity function includes:
    selecting a position closest to the surface from a plurality of positions where destructive interference occurs; and
    determining the threshold value based on the position closest to the surface.

* * * * *